United States Patent
Fourrey et al.

(10) Patent No.: US 6,767,067 B2
(45) Date of Patent: Jul. 27, 2004

(54) STRUCTURE FOR A VEHICLE SEAT ELEMENT, AND A METHOD OF MAKING SUCH A STRUCTURE

(75) Inventors: François Fourrey, Corquilleroy (FR); Babak Eskandanian, Poissy (FR); Ziyad Nabil, Massy (FR)

(73) Assignee: Faurecia Sièges d'automobile S.A., Nanterre (FR)

( * ) Notice: Subject to any disclaimer, the term of this patent is extended or adjusted under 35 U.S.C. 154(b) by 0 days.

(21) Appl. No.: 10/308,277

(22) Filed: Dec. 3, 2002

(65) Prior Publication Data

US 2003/0117003 A1 Jun. 26, 2003

(30) Foreign Application Priority Data

Dec. 4, 2001 (FR) ............................................. 01 15636

(51) Int. Cl.[7] ................................................ A47C 7/02
(52) U.S. Cl. ................................ 297/452.18; 297/452.2
(58) Field of Search ......................... 297/452.18, 452.2

(56) References Cited

U.S. PATENT DOCUMENTS

| | | | | |
|---|---|---|---|---|
| 4,544,204 A | * | 10/1985 | Schmale | 297/452.18 |
| 5,029,942 A | * | 7/1991 | Rink | 297/452.18 |
| 5,779,313 A | | 7/1998 | Rohee | |
| 5,988,756 A | * | 11/1999 | Aufrere et al. | 297/452.18 X |
| 6,059,369 A | | 5/2000 | Bateson et al. | |
| 6,398,300 B1 | * | 6/2002 | Young | 297/452.18 |
| 6,423,388 B1 | * | 7/2002 | Bateson et al. | 297/452.2 X |

FOREIGN PATENT DOCUMENTS

| | | |
|---|---|---|
| DE | 4423739 | 11/1996 |
| DE | 19757060 A1 | 6/1999 |
| DE | 19827563 A1 | 12/1999 |
| EP | 372337 | 6/1990 |
| FR | 2740406 A1 | 4/1997 |
| WO | WO-9808705 | 3/1998 |

OTHER PUBLICATIONS

International Search Report; FR 0115636 dated Jul. 18, 2002.

* cited by examiner

*Primary Examiner*—Anthony D. Barfield
(74) *Attorney, Agent, or Firm*—Marshall, Gerstein & Borun LLP

(57) ABSTRACT

A rigid structure for a vehicle seat element, the structure being formed as a single piece made of a composite material comprising a thermoplastic matrix and reinforcing fibers forming at least firstly first and second rigid sideplates each extending between a first end and a second end, and secondly a rigid horizontal cross-member secured to the second ends of the sideplates. The structure has at least one hinge comprising a first fixing portion overmolded by the first end of the first sideplate.

9 Claims, 14 Drawing Sheets

STRUCTURE FOR A VEHICLE SEAT ELEMENT, AND A METHOD OF MAKING SUCH A STRUCTURE

FILED OF THE INVENTION

The present invention relates to a rigid structure made of composite-material for a vehicle seat element, and to methods of making such structures.

More particularly, amongst such structures, the invention relates to those formed as a single piece made from a composite material comprising a thermoplastic matrix and reinforcing fibers, the structure comprising at least firstly first and second rigid sideplates each extending between a first end and a second end, and secondly a rigid horizontal cross-member secured to the second ends of the sideplates.

BACKGROUND OF THE INVENTION

Such structures for seat elements formed by vehicle seat backs are described in particular in U.S. Pat. No. 6,059,369. Those seat back structures may be provided with a central core of foam having braids molded around them, the braids comprising glass fibers and/or carbon fibers impregnated in thermoplastic resin. When preparing the central core of foam, small diameter metal bushings may be integrated in the core for the purpose subsequently of receiving pivot mechanisms for pivotally connecting the rigid seat back structure to a rigid structure for the seat proper of the vehicle seat.

Thus, in order to be able to fix a pivot mechanism on the metal bushing integrated in the central foam core covered by composite fiber braids, it is necessary to perform an additional step during final assembly of the seat, thereby increasing the time required to assemble said seat, and thus its manufacturing cost.

Furthermore, the small size of the metal bushing that is to receive the hinge provides little contact area between the composite reinforcing fibers and the metal bushing, which can lead to the connection between the bushing and the composite fibers breaking when the hinge is subjected to large forces.

OBJECTS AND SUMMARY OF THE INVENTION

An object of the present invention is to solve the technical problems posed by the above-mentioned state of the art.

According to the present invention, this object is achieved by the facts that the structure further comprises at least one hinge having a first fixing portion secured to the structure, a second fixing portion for fixing to another seat element, and a hinge mechanism interconnecting the first and second fixing portions and actuatable by a control member so that said first and second fixing portions are either free to pivot relative to each other about a pivot axis or else are locked angularly relative to each other, and that the first fixing portion of the hinge is overmolded by the first end of the first sideplate.

In preferred embodiments of the invention, recourse is also made to one or more of the following dispositions:

a portion of the first end of the first sideplate in contact with the first fixing portion of the hinge presents a housing having an end wall pressed against the first fixing portion of the hinge, and a side wall extending from said end wall and covering the first fixing portion of the hinge axially, at least in part;

the side wall of the housing of the first end of the first sideplate presents a curved edge which extends radially towards the pivot axis of the hinge;

the first fixing portion of the hinge comprises a plurality of elements in relief onto which the first end of the first sideplate is overmolded;

the composite material comprises a tubular braid of reinforcing fibers including a segment forming the first end of the first sideplate which presents a section that is substantially flat and double-walled;

the first end of the second sideplate includes a pivot element for pivotally mounting on the other seat element, said pivot element being integrally formed with the first end of the second sideplate;

a second hinge is also overmolded by the first end of the second sideplate of the structure;

the structure also comprises a second rigid horizontal cross-member having a first end integrally formed with the first end of the second sideplate and a second end overmolded on the first end of the first sideplate; and the structure is formed by a rigid structure for a seat back.

The invention also provides a method of manufacturing a rigid structure for a vehicle seat element, said structure comprising firstly first and second rigid sideplates each extending between a first end and a second end, and secondly a rigid horizontal cross-member secured to the second ends of the sideplates, said cross-member and the sideplates being made as a single piece out of a composite material comprising a thermoplastic matrix and reinforcing fibers, the method comprising the following steps:

providing a hinge comprising a first fixing portion, a second fixing portion for fixing to another seat element, and a hinge mechanism interconnecting the first and second fixing portions and actuatable by a control member so that the first and second fixing portions are either free to pivot relative to each other about a pivot axis or else are angularly locked relative to each other; and the composite material portion forming the first end of the first sideplate is overmolded onto the first fixing portion of the hinge.

In preferred implementations of the invention, recourse is also made to one or more of the following dispositions of the method:

the composite material comprises a tubular braid of reinforcing fibers, said method comprising the following steps:

inserting an inflatable bladder in the tubular braid;

placing the hinge in a mold defining a cavity of shape complementary to the outside shape of the structure;

placing the tubular braid in the mold; and heating the mold and inflating the inflatable bladder under pressure to compress the tubular braid against the cavity of the mold and to cause the thermoplastic matrix to melt which matrix, after hardening, enables said structure to be obtained, the braid portion forming the first end of the first sideplate being compressed and overmolded onto the first fixing portion of the hinge;

prior to the tubular braid hardening, the hinge is moved towards the first end of the first sideplate along the pivot axis to bond together at least two portions of the first end of the tubular braid placed facing each other;

prior to placing the tubular braid in the mold, a second hinge is placed in the mold, and while the inflatable bladder is being inflated, the portion of the tubular braid that forms the second end of the second sideplate is pressed against and overmolded onto the second hinge;

the tubular braid is of a length that is suitable for forming a second horizontal cross-member having a first end formed integrally with the first end of the second sideplate, and a second end which, during inflation of the inflatable bladder, is compressed and overmolded onto the first end of the first sideplate against which the hinge is overmolded; and the mold is provided with at least two projecting members to enable two diametrically opposite portions of the tubular braid to be compressed during inflation of the inflatable bladder respectively against the associated projecting member, thereby forming two blind holes each having an inside wall, each blind hole subsequently being pierced, once the thermoplastic matrix has hardened, so as to form a through housing with an inside wall in the structure of the seat element.

BRIEF DESCRIPTION OF THE DRAWINGS

Other characteristics and advantages of the invention appear from the following description of several embodiments, given as non-limiting examples and with reference to the accompanying drawings.

In the drawings.

MORE DETAILED DESCRIPTION

In the various figures, the same references designate elements that are identical or similar.

Figure 1:
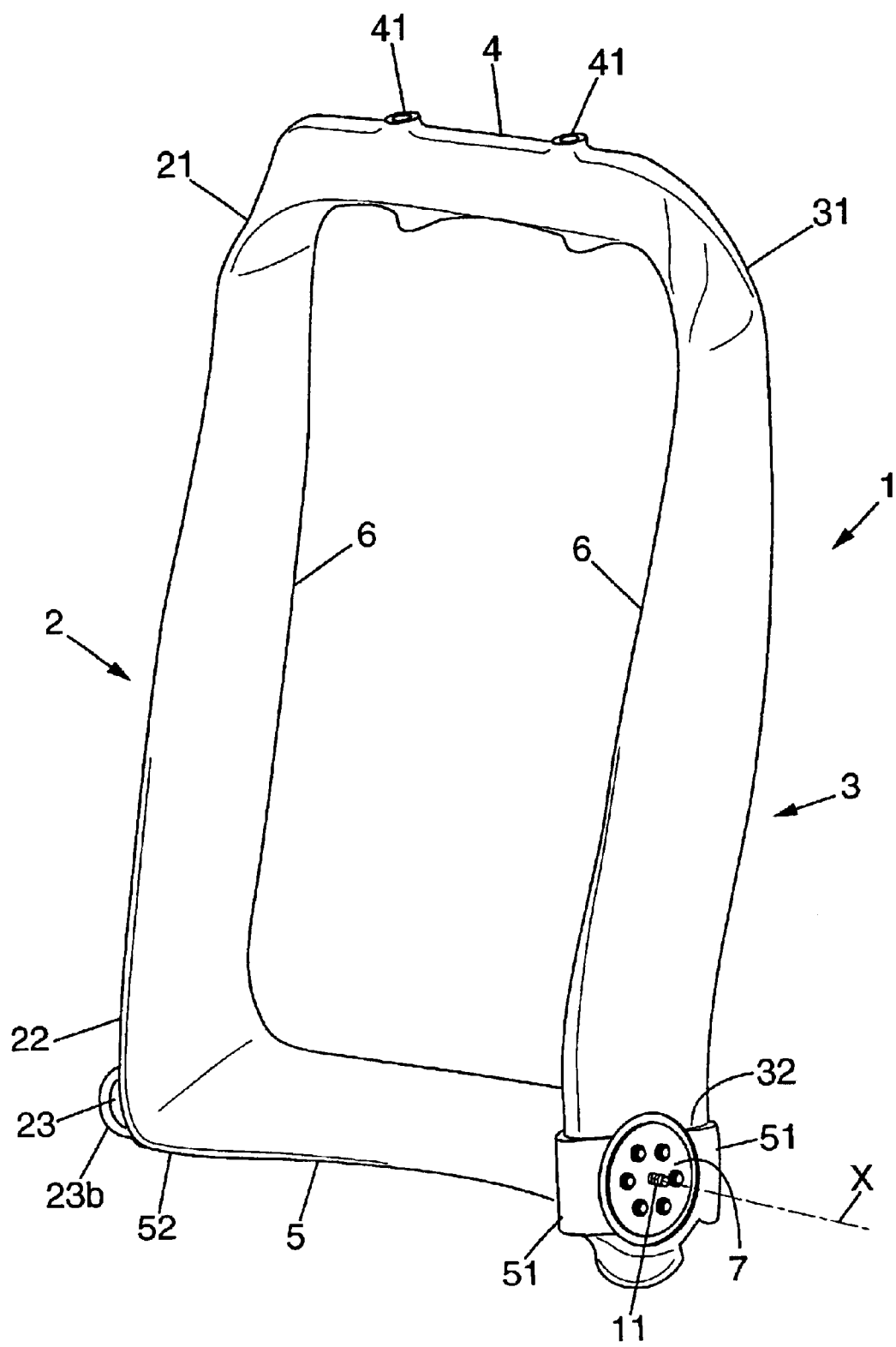
FIG. 1 is a front view in perspective of the structure of a seat element constituting a first embodiment of the invention, with a hinge overmolded in the structure.
Figure 2:
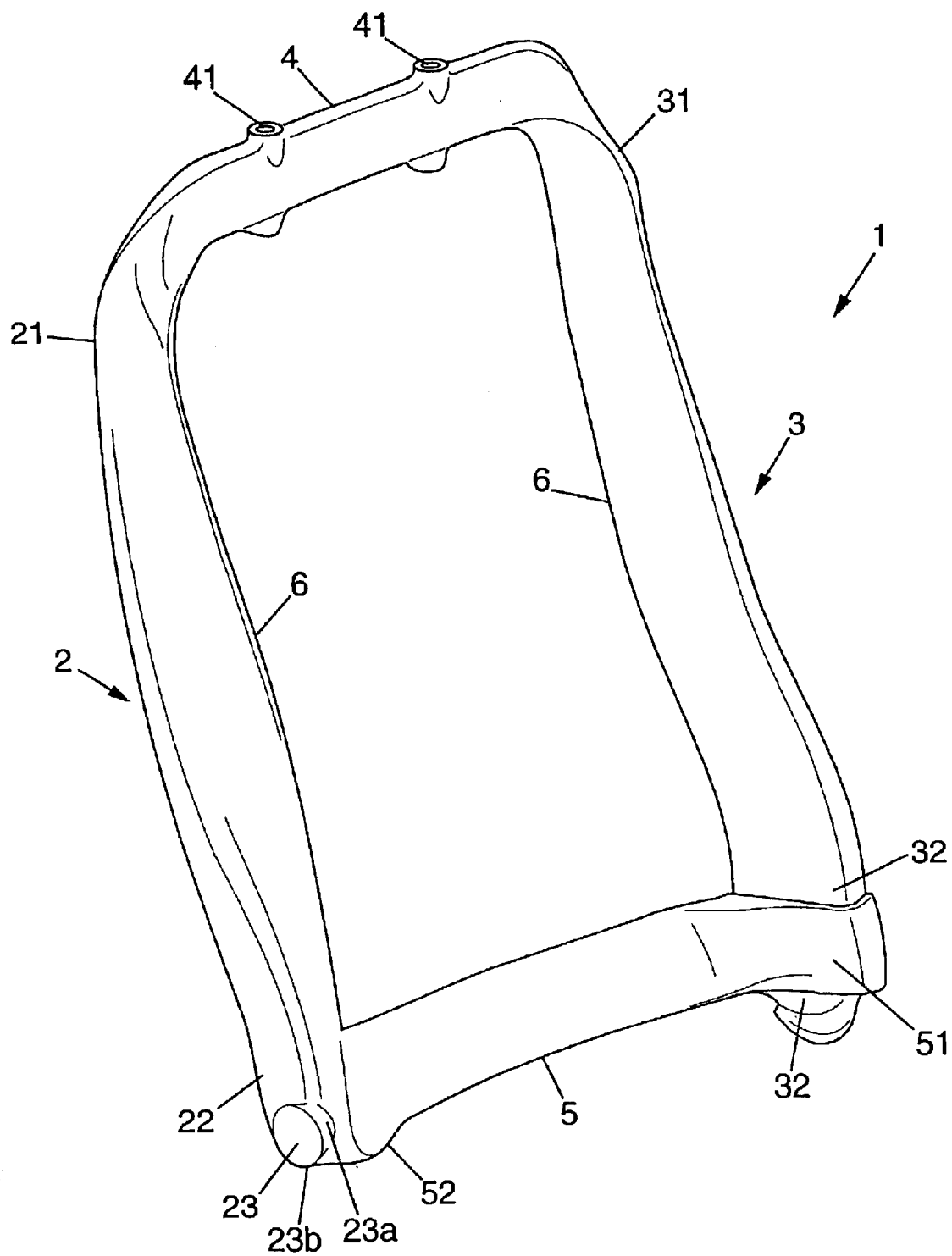
FIG. 2 is likewise a front view in perspective of the FIG. 1 seat element structure, seen from a different viewpoint.

The rigid structure of a seat element shown in FIGS. 1 and 2 is constituted by a rigid structure for a seat back 1 comprising first and second sideplates or side uprights 2 and 3, each of which extends between a first end 22, 32 and a second end 21, 31. In this embodiment of a seat back structure, the first ends 22 and 32 of the side uprights 2 and 3 correspond to bottom ends, while the second ends 21 and 31 correspond to top ends of said uprights 2, 3. The seat back structure also comprises a top horizontal cross-member 4 which interconnects the top ends 21 and 31 of the side uprights 2 and 3, and a bottom horizontal cross-member 5 which interconnects the bottom ends 22 and 32 of said side uprights 2 and 3.

The two side uprights 2 and 3, and the top and bottom cross-members 4 and 5 are made as a single piece which is made from a composite material comprising a thermoplastic matrix and reinforcing fibers. More exactly, the composite material is constituted by a braid 6, e.g. comprising glass fibers and/or carbon fibers together with thermoplastic fibers. Prior to the braid 6 being shaped to the dimensions of the seat back structure, it is presented in substantially tubular elongate form, with one end corresponding to the bottom end 32 of the side upright 3 while its other end corresponds to the end 51 of the bottom cross-member 5 which is connected to the bottom end 32 of the side upright 3. Thus, in this embodiment, the end 52 of the bottom cross-member 5 which is connected to the bottom end 22 of the side upright 2 is formed integrally therewith.

In accordance with the invention, the seat back structure 1 also comprises at least one hinge 7 which may be in the form of a round case having the bottom end 32 of the side upright 3 overmolded directly thereon while the structure 1 is being molded as described in detail below.

The hinge 7 shown in FIGS. 3 to 10 mainly comprises an internal, first fixing portion 8 intended to have the seat back structure overmolded thereon, and an external, second fixing portion 9 designed to be fixed to another vehicle seat element, such as the rigid structure of a seat proper. For this purpose, the external, second fixing portion 9 may be provided with elements in relief 9a designed to be received in corresponding housings in the rigid structure of the seat proper. The hinge 7 also comprises a hinge mechanism 10 which connects together the first and second fixing portions 8 and 9 and which is adapted to enable the first and second fixing portions 8 and 9 to turn relative to each other about a pivot axis X or else to lock the first and second fixing portions 8 and 9 angularly relative to each other. The hinge 7 is also provided with a control member 11 for being turned about the axis X by a handle to lock or unlock the hinge mechanism 10.

Figure 3:
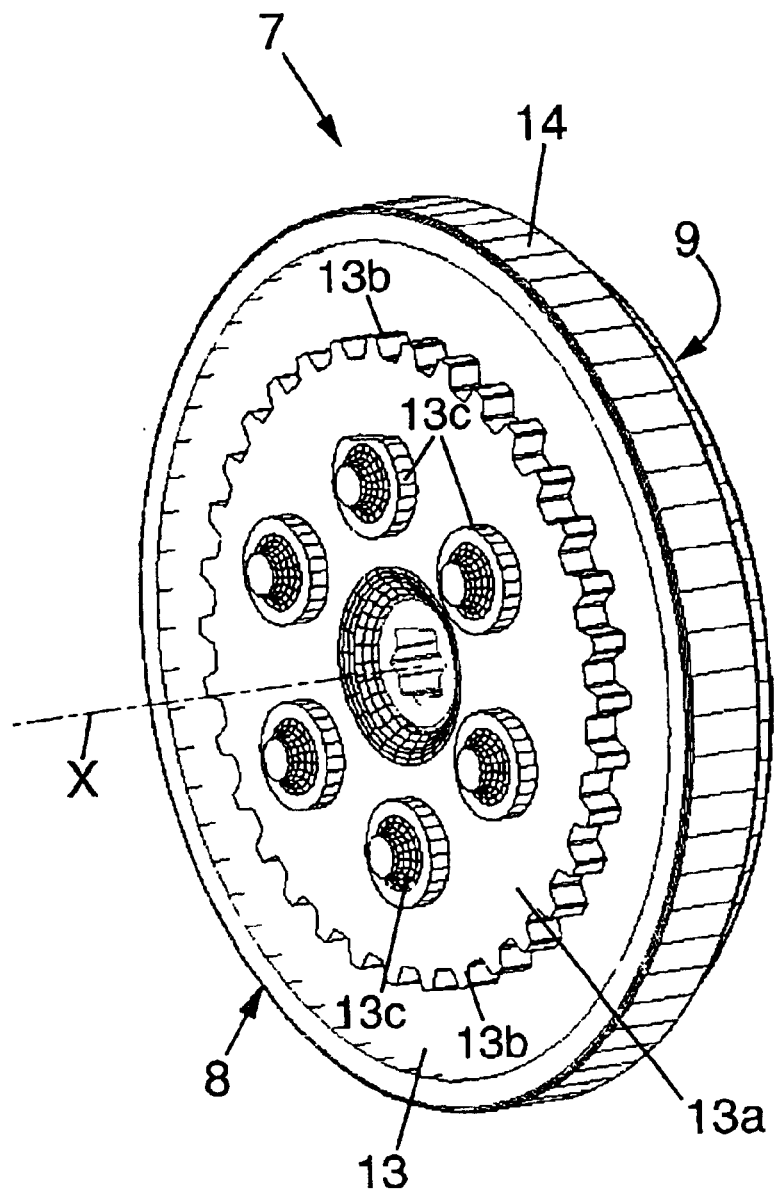
FIG. 3 is a perspective view of the hinge for being overmolded by the structure.

As can be seen in FIGS. 3 to 10, the internal, first fixing portion 8 comprises a circular cheek plate 13 and a sheet metal ring 14 which is crimped onto the periphery of the cheek plate 13 and which partially overlaps the external, second fixing portion 9 which is likewise in the form of a circular cheek plate. This sheet metal ring 14 thus closes the hinge and holds the peripheries of the two cheek plates 9 and 13 against each other. As can be seen in FIG. 3, the cheek plate 13 of the internal fixing portion 8 is provided with a ring 13a whose peripheral edge has teeth 13b between which the bottom end 32 of the first upright 3 of the braid 6 is received so as to take a shape that is complementary to the shape of the teeth during the molding operation. Similarly, the ring 13a is also provided with a plurality of studs 13c onto which the braid 6, or more precisely its bottom end 32, is overmolded so as to fit closely to the outside shape of said studs 13c. This hinge 7 is known per se and it is described in numerous patents, and in particular in French patent application FR 2 740 406, and it is not described in greater detail below in the present description.

Similarly, the hinge may also be in the form of two elongate cheek plates forming the first and second fixing portions that are connected to each other likewise by a hinge mechanism.

As can be seen in FIGS. 1 and 2, the bottom end 22 of the side upright 2 is also provided with a pivot element 23 that is to be received in a support element (not shown) of complementary shape made in the rigid structure of the seat proper. This pivot element 23 comprises a cylindrical portion 23a having a first end connected to the bottom end 22 of the side upright 2 and a second end which extends so as to form a radially projecting rim 23b. The pivot element 23 is made from the braid 6 and it is therefore integrally formed with the bottom end 22 of the side upright 2.

The method of molding the seat back structure is described below with reference to FIGS. 5 to 10 and FIGS. 11 and 12.

In a first step of the method (not shown), an inflatable bladder 61 is initially inserted inside the tubular braid 6 which is then in the form of a substantially elongate shape.

During this first step of the method, the hinge 7 is also placed in a mold 15 (FIG. 11) or more precisely in a portion 15c of the mold 15. The portion 15c of the mold 15 has a substantially rectangular recess forming a portion of the mold cavity 15a which is complementary in shape to the outside shape selected for the seat back structure. Naturally, depending on the cavity 15a of the mold 15, the rigid structure 1 of the seat back may have sections that are substantially flattened or sections that are circular (see FIG. 1) as a function of the forces and the stresses to which the seat back structure is subjected in use.

Figure 11:
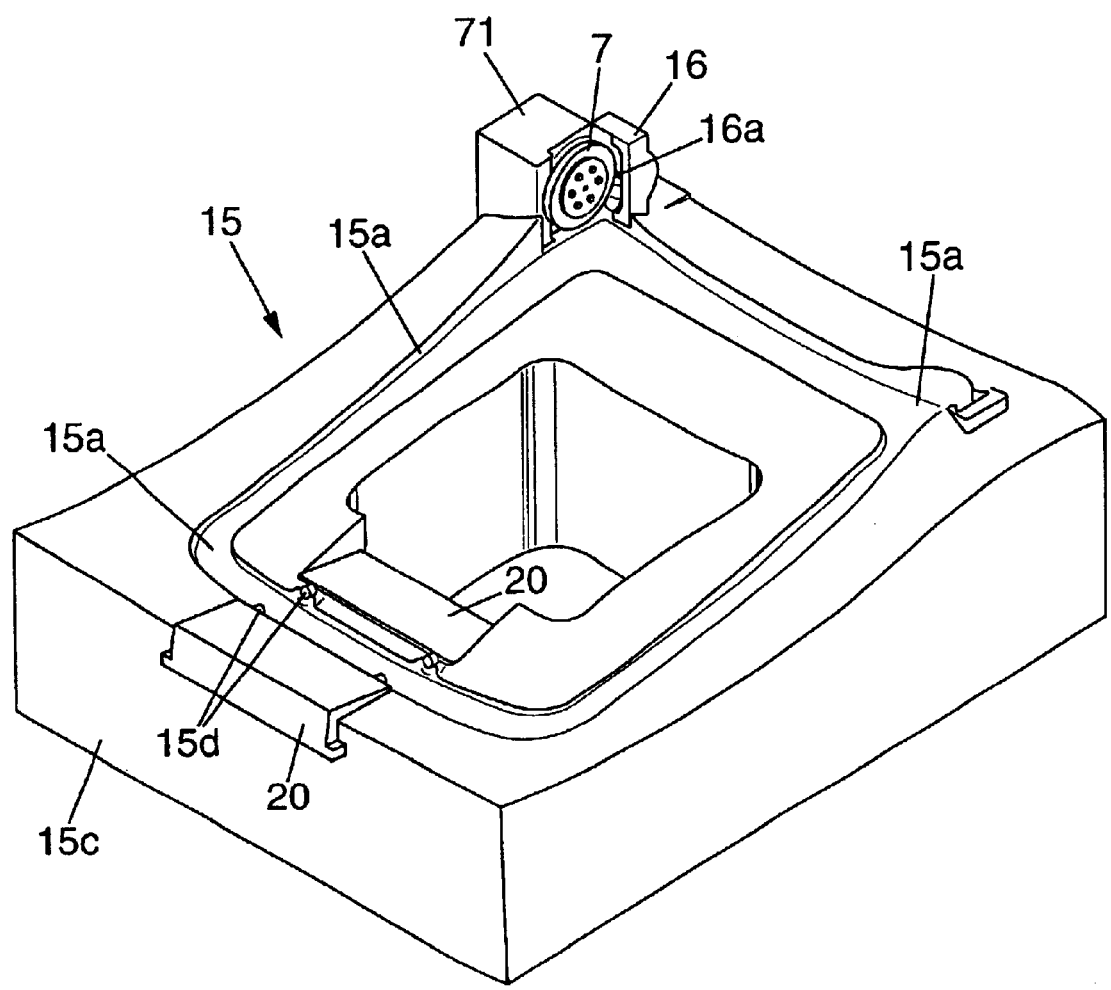
FIG. 11 is a perspective view of one of the halves of the mold showing its cavity before the molding process.
Figure 12:
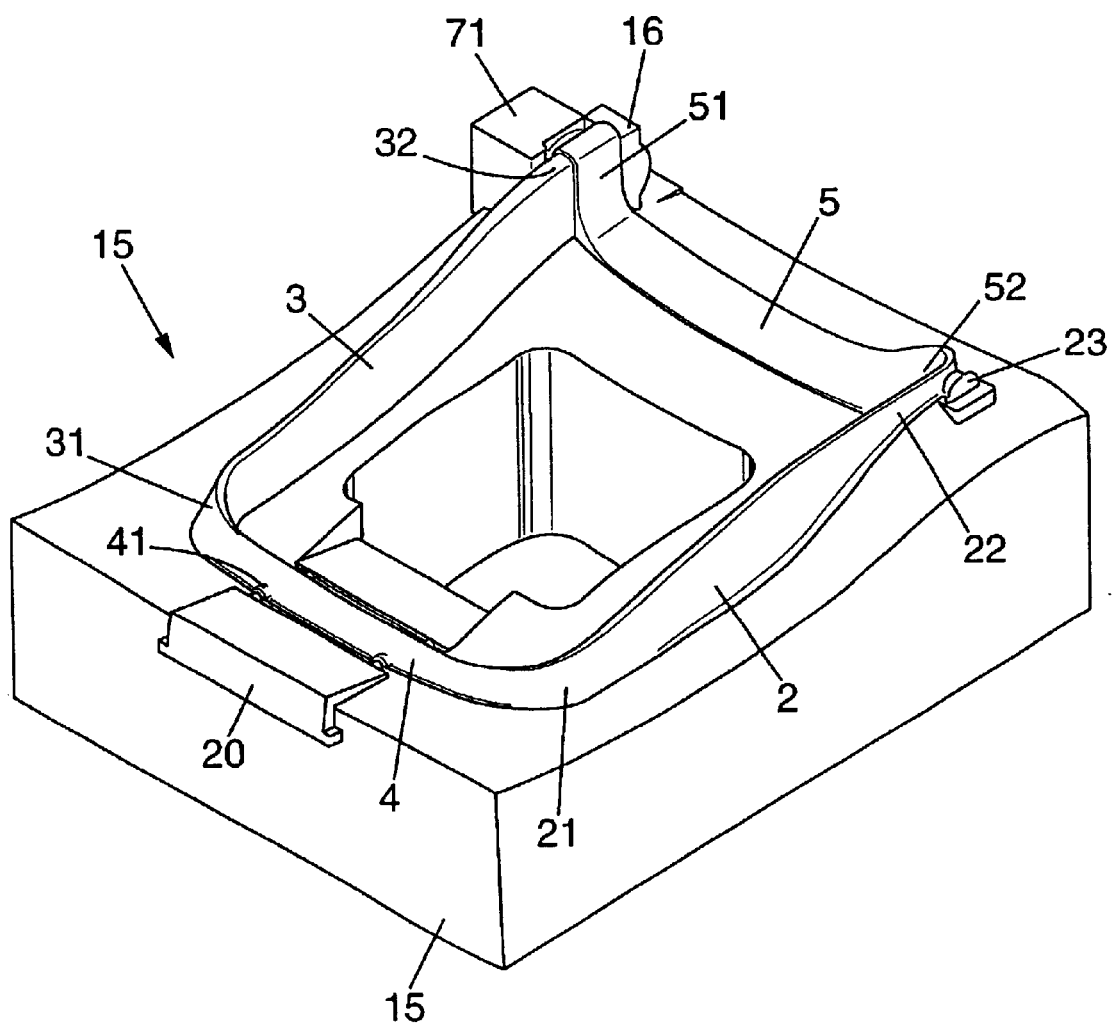
FIG. 12 is a perspective view of the mold half after the seat element structure has been obtained by the molding process.

As can be seen in FIG. 11, the hinge 7 is fitted to a block 71, itself projecting from the portion 15c of the mold, and more exactly from the location where the bottom end 32 of the first side upright 3 of the rigid structure of the seat back is to be made. The portion 15c of the mold also has a retention member 16 placed in the vicinity of the block 71, this retention member 16 serving to receive and clamp onto one of the ends of the tubular braid 6. The retention member 16 also has an air outlet orifice 16a through which the air under pressure is delivered to the inflatable bladder 61 of the tubular braid 6. Under such circumstances, the end of the tubular braid 6 and the corresponding end of the inflatable bladder 61 sandwiched by the retention member 16 nevertheless present an air inlet orifice 12 (FIG. 4) connected to the air outlet orifice 16a of the retention member.

Figure 5:
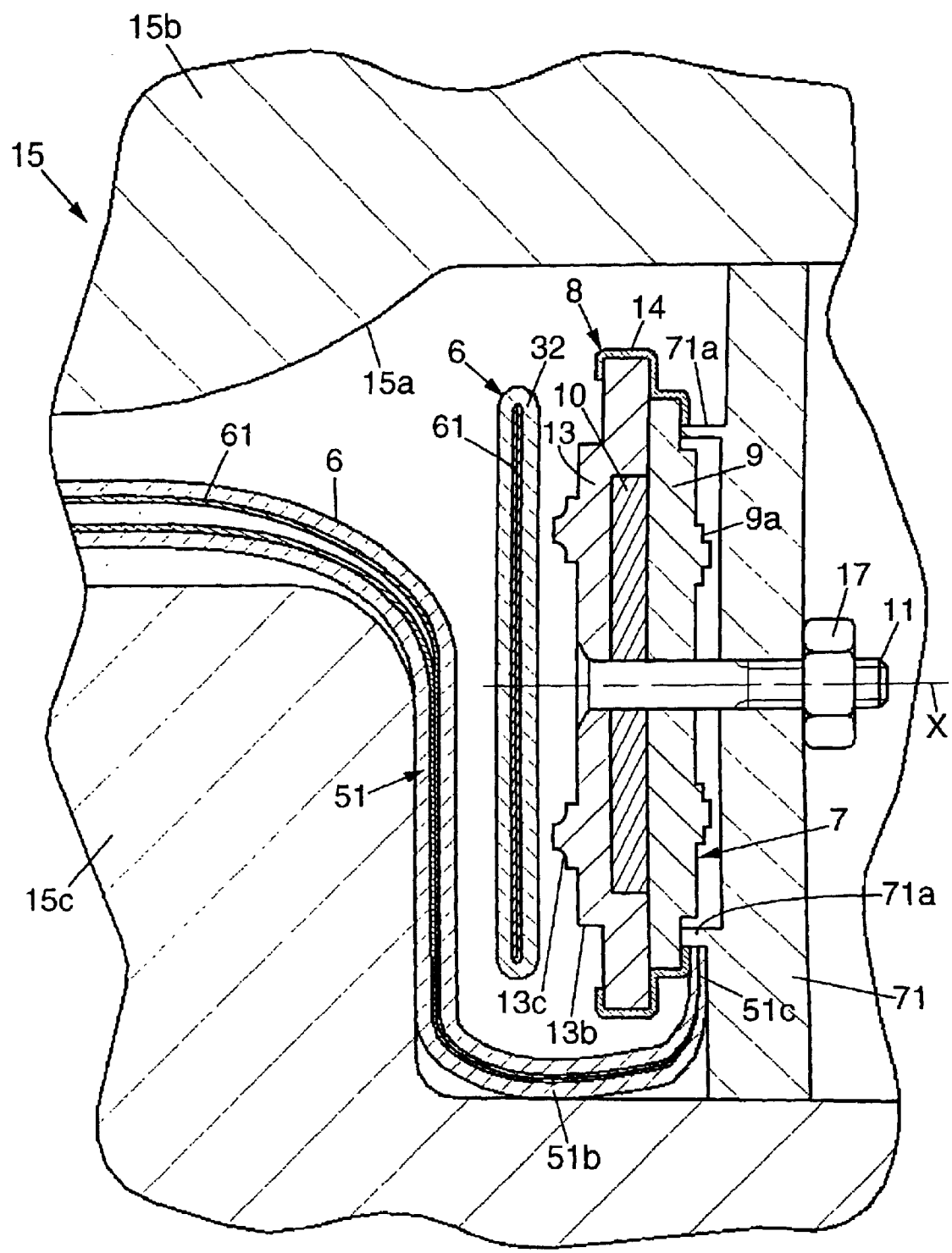
FIGS. 5 to 10 are diagrammatic section views through a portion of a mold during the step of overmolding the structure onto the hinge.
Figure 6:
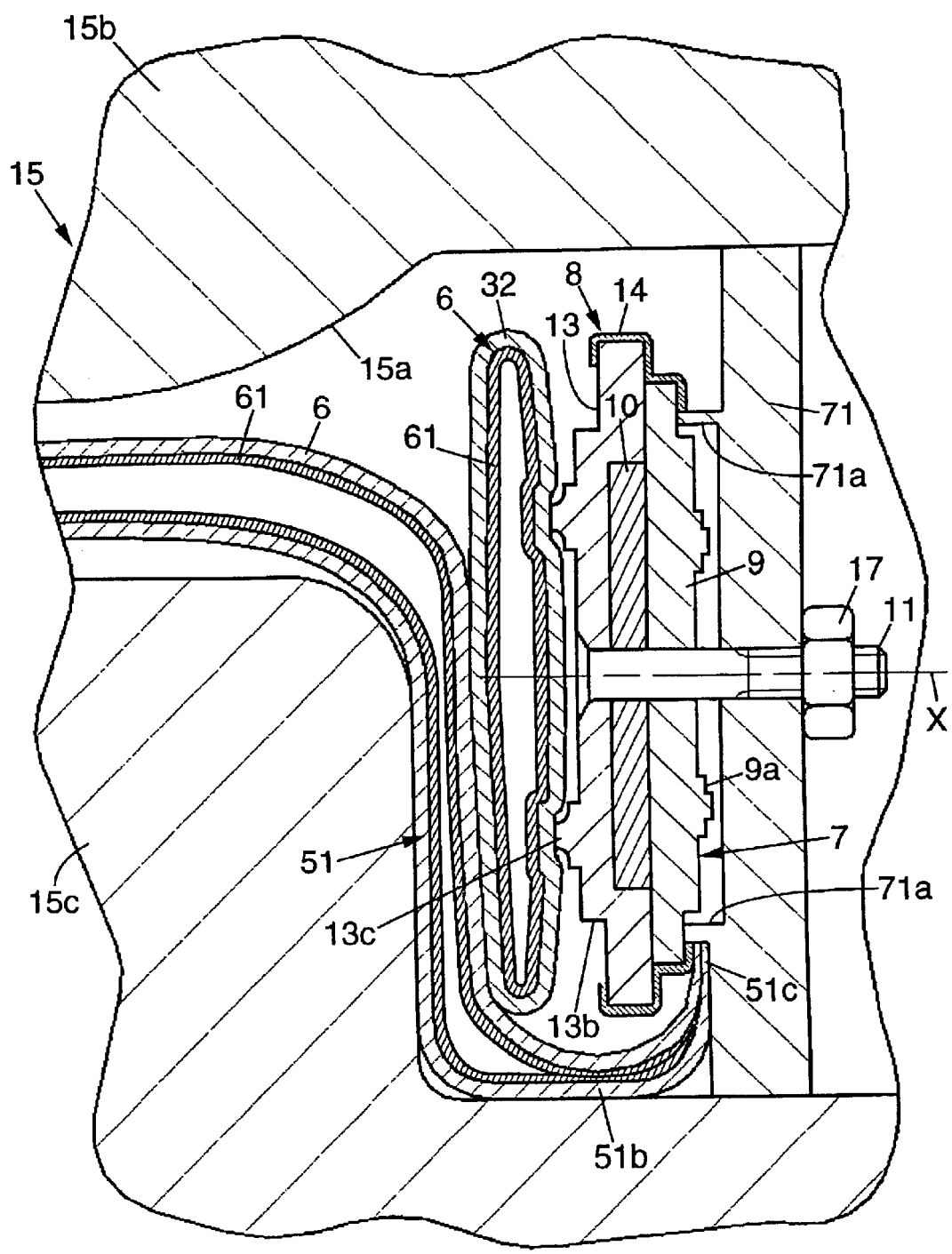
Figure 7:
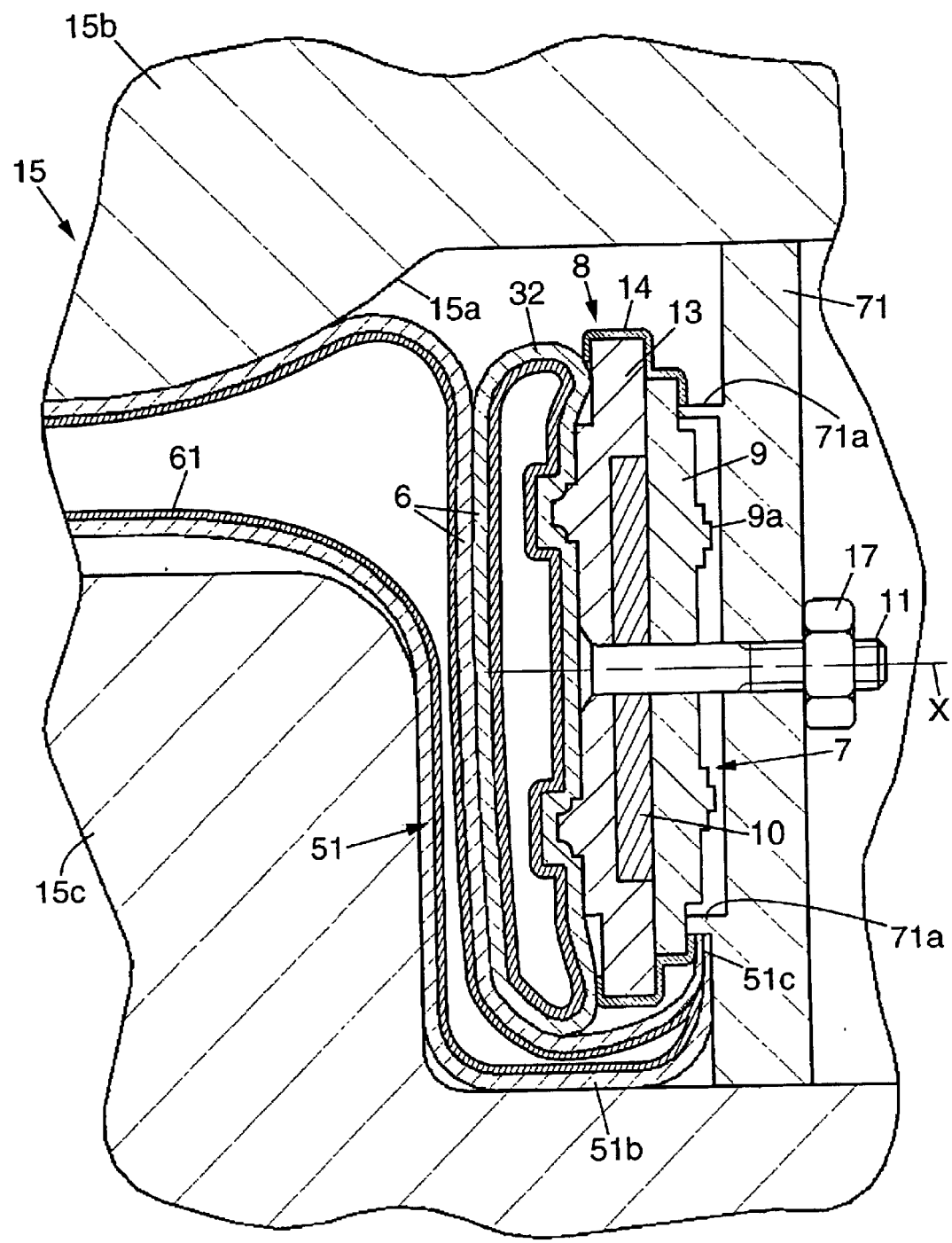
Figure 8:
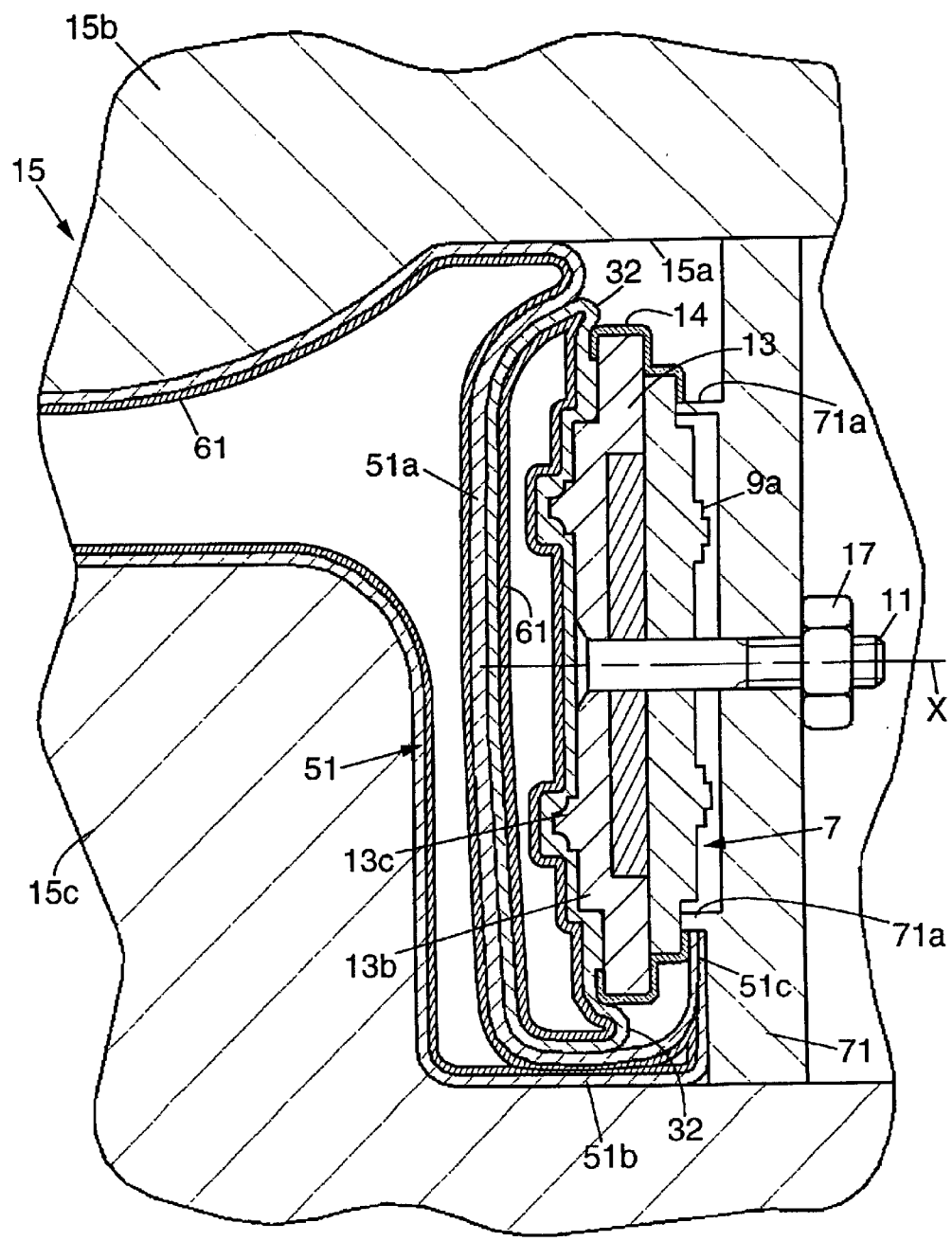

Thus, when the inflatable bladder 61 is inserted into the tubular braid 6, the resulting assembly is subsequently placed in the mold. For this purpose, and as can be seen in FIG. 5, the portion of the tubular braid that forms the bottom end 32 of the side upright 3 is substantially flattened firstly so as to be pressed against the retention member 16 while being connected via the inflatable bladder 61 to the air outlet orifice 16a of the retention member 16, and secondly so as to be disposed substantially facing the internal first fixing portion 8 of the hinge 7. In a variant, the portion of the tubular braid 6 that is to form the bottom end 32 of the side upright 3 can be placed against and clamped onto the retention member 16, with the retention member then being placed in the mold in such a manner that the end portion of the tubular braid 6 is placed facing the internal first fixing portion 8 of the hinge 7. Similarly, the portion of the tubular braid 6 forming the bottom end 51 of the horizontal cross-member 5 is clamped against the sheet metal ring 14 of the hinge 7 and a portion of the block 71 on which the hinge 7 is mounted.

For this purpose, the block 71 may have a substantially circular projecting member 71a which is received against the edge of the sheet metal ring 14 of the first fixing portion 8 of the hinge 7, while the control member 11 is received in an orifice formed in the block 71 and is fixed thereto by a nut system 17 enabling the end 51 of the braid to be clamped against the block 71.

The portion of the tubular braid 6 forming the end 51 of the horizontal cross-member 5 may be fixed between the hinge 7 and the block 71 prior to said block 71 being put into place in the portion 15c of the mold 15.

When the ends 51 and 32 of the tubular braid 6 are thus placed in the mold, the remainder of the middle portion of the braid 6 is also placed in the cavity 15a of the portion 15 of the mold in such a manner as to form substantially a closed frame.

The mold is then closed by putting the portion 15b of the mold 15 into place (FIG. 5). The portions 15b and 15c of the mold 15 also include heater means enabling the mold 15 to be heated to a certain temperature.

Thus, when the mold is closed, it is heated to a temperature of about 235° C., and the air under pressure (at a pressure of about 8 bars to 12 bars) is delivered into the inflatable bladder 61 through the air outlet orifice 16a of the retention member 16, thus enabling the braid to be pressed and thrust against the hinge 7 and against the mold cavity 15a during at least partial melting of the thermoplastic fibers contained in the braid 6. The inflatable bladder 61 may be made using silicone, for example, or any other elastomer having good elasticity and sufficient ability to withstand high temperatures. By way of example, the thickness of the inflatable bladder 61 may be about 0.1 millimeters (mm).

Figure 9:
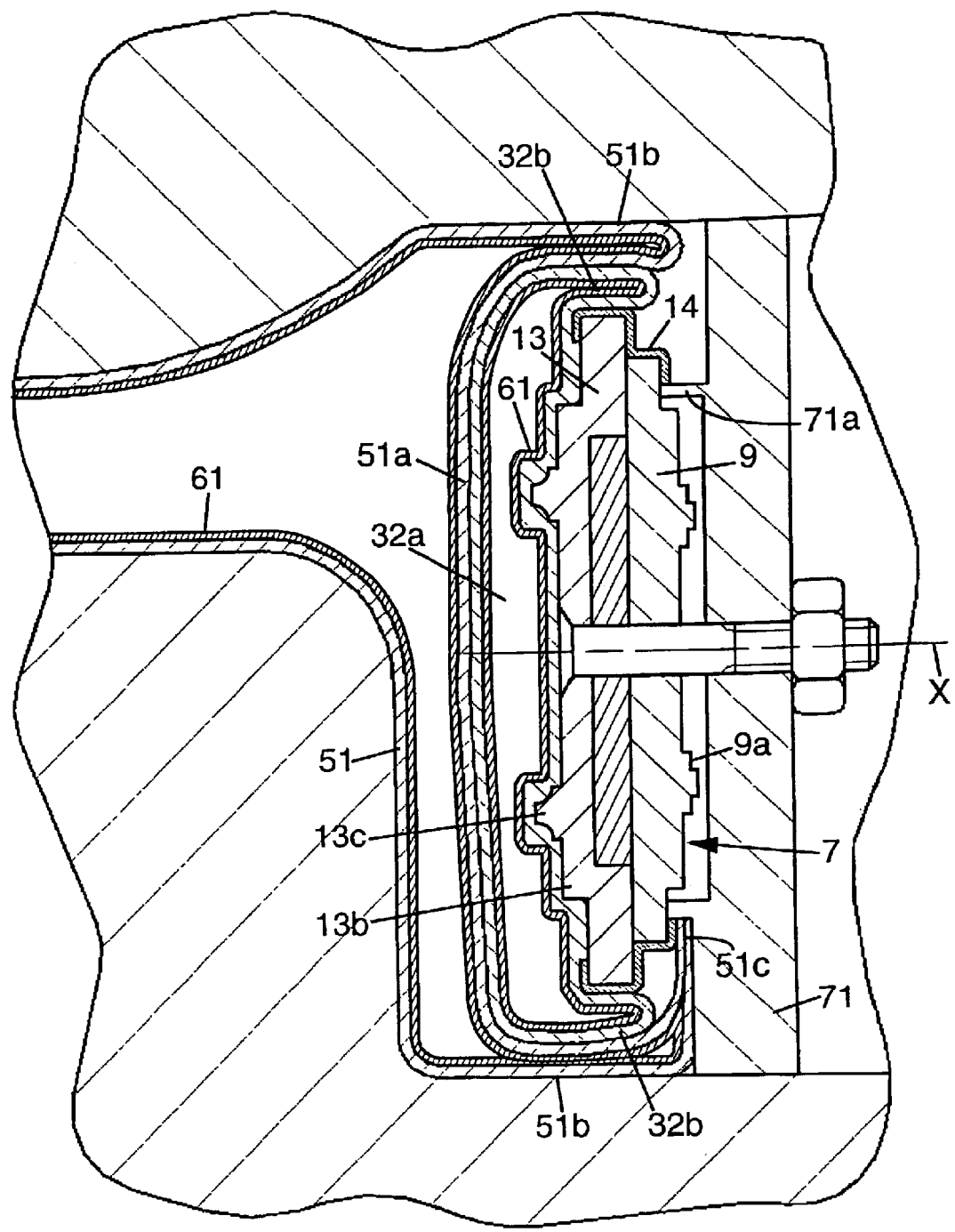

As can be seen in FIGS. 5 to 9, once sufficient air pressure is applied to the inflatable bladder 61 via the air outlet orifice 16a of the retention member 16, the ends 51 and 32 of the braid 6 deform by expanding and thus progressively fill up the empty spaces defined by the cavity 15a of the mold 15, the fixing portion 8 of the hinge 7, and the block 71. As can be seen in FIG. 9, the cavity 15a of the mold 15 together with the block 71 for the hinge 7 presents shapes that are adapted to enable the bottom end 32 of the upright 3 to take up a section that is flat and double-walled, with the wall in contact with the hinge 7 presenting a housing having an end wall 32a pressed against the internal first fixing portion 8 of the hinge 7, and a substantially cylindrical side wall 32b covering said internal first fixing portion 8 at least partially and axially towards the outside, i.e. covering the circular cheek plate 13 and the circular ring 14 of sheet metal.

During the steps of the method as shown in FIGS. 5 to 9, the end 51 of the braid 6 also deforms by expansion so as to form two double-walled side branches 51b which cover at least partially and axially towards the outside the bottom end portion 32 of the braid 6 in contact with the hinge 7.

Thus, the end 51 of the bottom cross-member 5 is of channel section, i.e. it has a middle branch 51a having a single wall which compresses the end wall 32a of the housing of the bottom end 32 of the first side upright 3 against the hinge 7, together with two side branches 51b which press against the cavity 15a of the mold and the portion of the bottom end 32 which is in contact with the sheet metal ring 14 of the hinge 7.

As can be seen in FIGS. 5 to 9, and more particularly in FIG. 5, the end 51 of the braid is put into place initially in the mold 15 in such a manner that while it is in the non-inflated state it presents a first side branch 51b which is extended by a curved end 51c clamped between the block 71 and the sheet metal ring 14 of the hinge 7.

The end wall 32a of the housing of the bottom end 32 takes up the shape of the portions in relief on the cheek plate 13 as constituted by the studs 13c and by the toothed peripheral edge 13b of the ring 13a due to being thrust against the hinge 7.

The presence of the studs 13c and of the tooth peripheral edge 13b of the ring 13a makes it possible to reinforce the connection between the seat back structure and the hinge 7 to a considerable extent when the hinge is subjected to large forces about its pivot axis X in operation.

Figure 10:
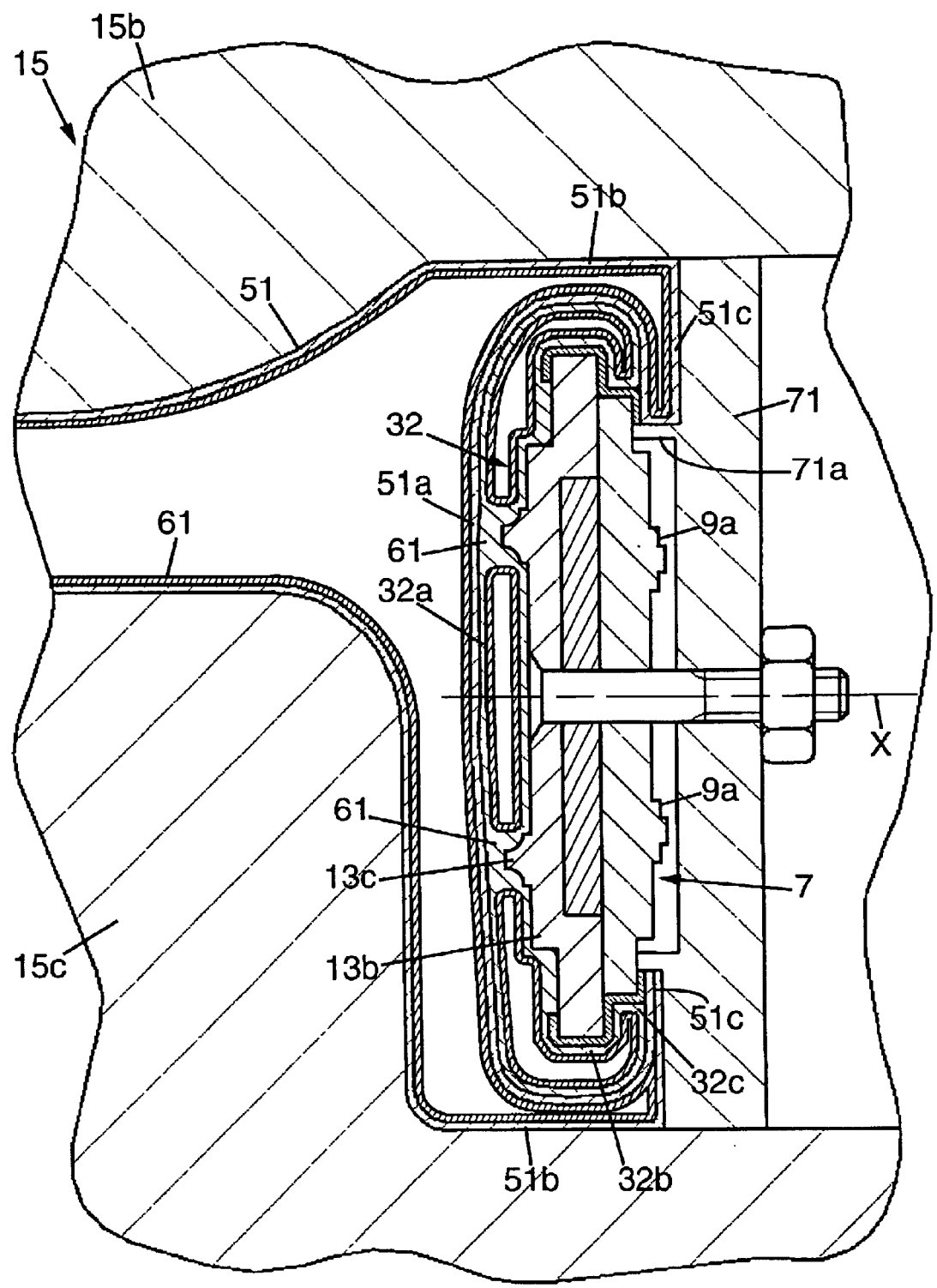

In a subsequent step shown in FIG. 10, and prior to the tubular braid 6 setting, the hinge 7 or more exactly the block 71 is moved towards the bottom end 32 of the upright 3 along the pivot axis X so as to bond at least two end wall portions 32a against the other wall of the bottom end 32 of the tubular braid 6. These two end wall portions 32a of the bottom end 32 of the tubular braid 6 may be formed, for example, by the portions that are situated in register with the studs 13c on the cheek plate 13 of the hinge 7.

During this step of advancing the hinge 7, or subsequently, air continues to be introduced under pressure into the inflatable bladder 61 so that the ends 32 and 51 of the braid 6 continue their deformation by expansion towards the block 71.

Figure 4:
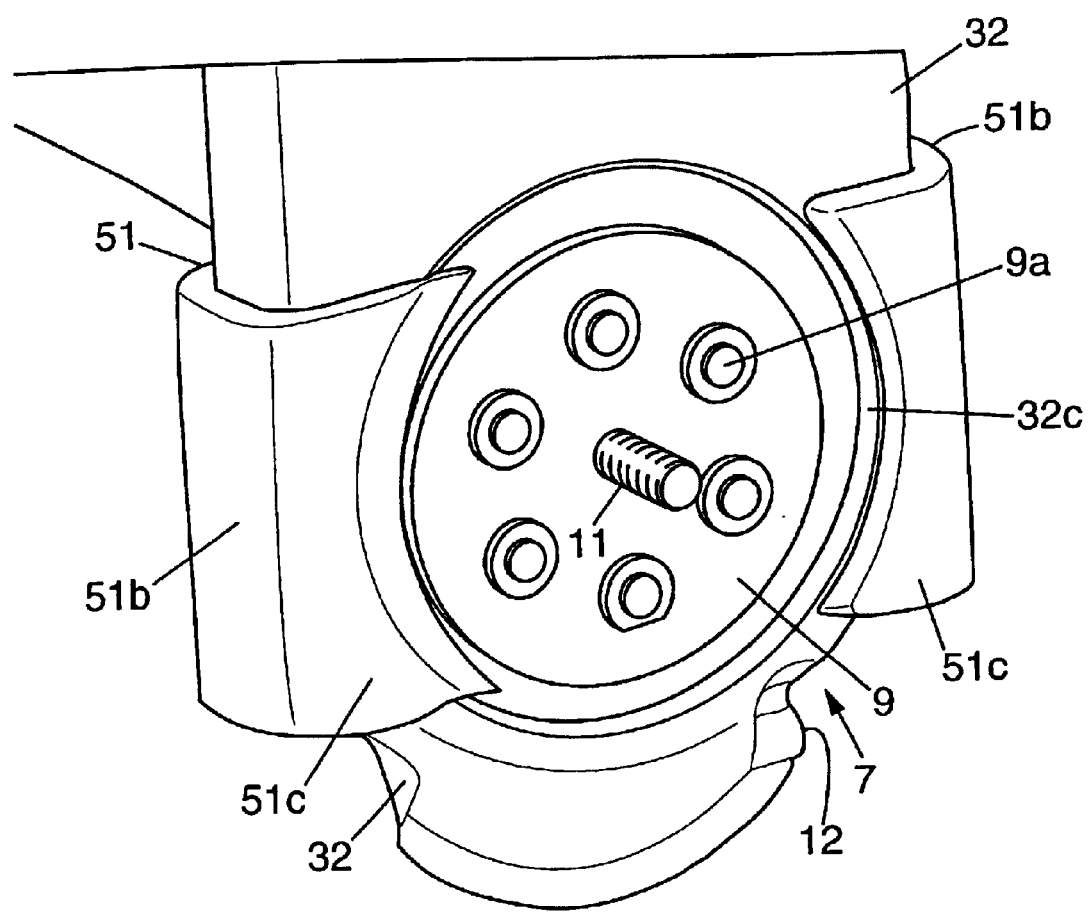
FIG. 4 is a perspective view on a larger scale of the connection zone between the hinge and the seat element structure shown in FIG. 1.

During this expansion shown in FIG. 10, the side wall 32b of the housing of the bottom end 32 of the first upright 3 then present a curved edge 32c which extends radially towards the pivot axis X of the hinge, being placed so as to press against the sheet metal ring 14 of the hinge 7, as can be seen in FIG. 4 which is a view on a larger scale of the connection between the hinge 7 and the bottom end 32 of the rigid structure of the seat back. Similarly, the end 51 of the braid 6 also continues to be formed in such a manner that the side branch 51b presenting a free end continues to expand, thereby forming a second curved end 51c that is substantially identical to the curved end 51c of the other side branch 51b sandwiched between the sheet metal ring 14 of the hinge 4 and the block 71.

After this last step of the inflation method and after the thermoplastic fibers forming the thermoplastic matrix contained in the braid have set, it suffices to separate the mold portions 15b and 15c so as to withdraw the seat back structure that has been made in this way (FIG. 12), disconnecting the hinge 7 from the block 71 by undoing the nut 17.

Figure 13:
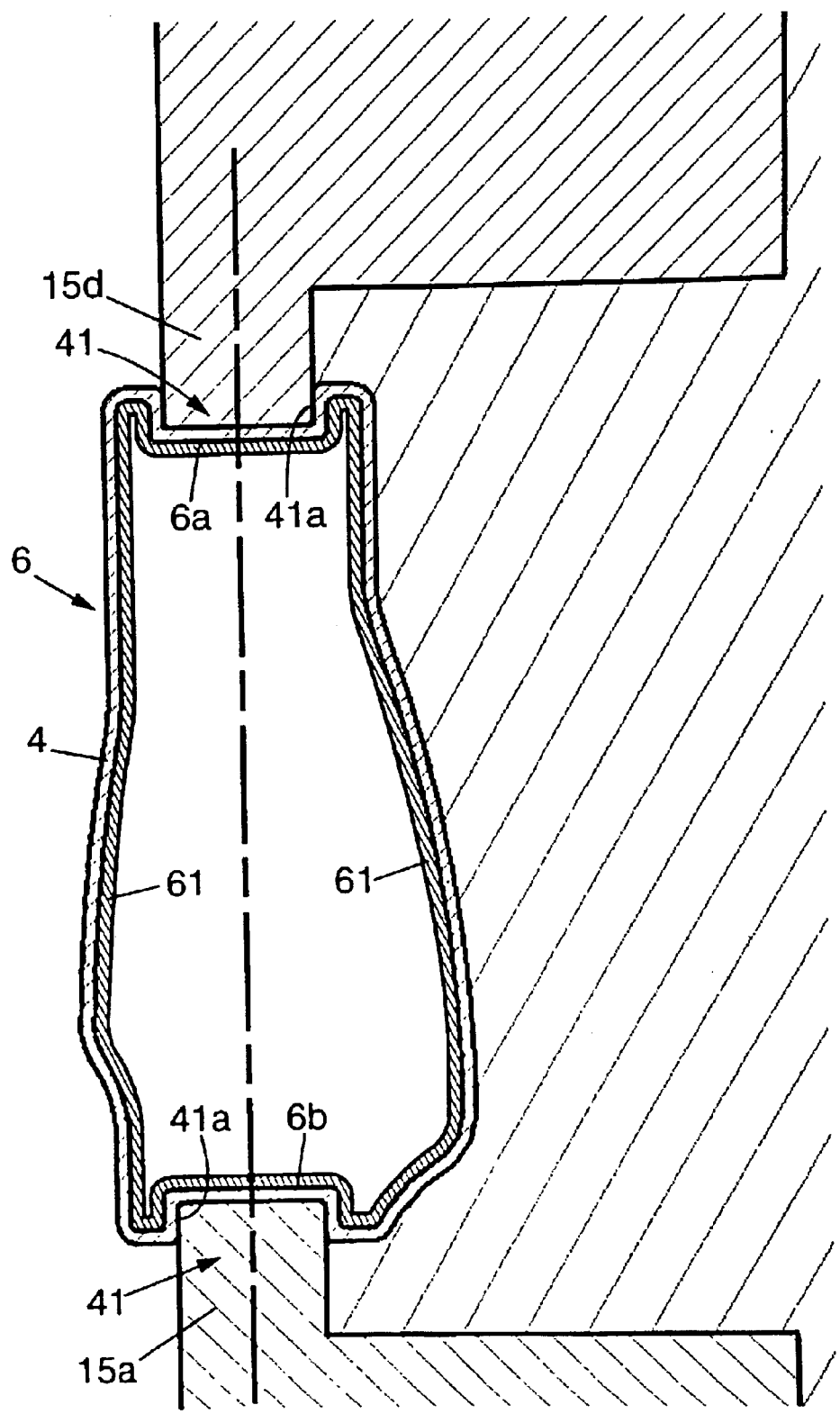
FIG. 13 is a diagrammatic section view through a portion of the mold serving to make housings in the structure for the purpose of fixing another vehicle seat element.

As can be seen in FIGS. 1 and 2, the rigid structure 1 of the seat back, or more exactly the top cross-member 4 also has housings 41 for receiving the rods of a headrest. As can be seen in FIG. 13, these housings 41 present an inner wall 41a integral with the braid assembly 6. In order to make these housings 41 in the braid 6, the mold may have projecting members 15d, for example (see FIGS. 11 and 12) which are substantially cylindrical in shape so that once the braid has been put into place in the mold, it is possible for two diametrically opposite portions 6a and 6b of the tubular braid to be compressed against the respective projecting members 15d associated therewith when the inflatable bladder is inflated. The projecting members 15d may be made on sliders 20 themselves removably mounted on the mold 15. Thus, after the thermoplastic fibers contained in the braid 6 have hardened, the braid is provided with two blind holes having end walls formed by the two previously pressed-together portions 6a, 6b. The two sliders 20 are subsequently separated from the mold by moving in translation relative to the mold 15 after which it suffices merely to pierce an orifice through the pressed-together portions 6a and 6b so as to provide the through housings 41 shown in FIGS. 1 and 2, which housings are placed side by side.

Figure 14:
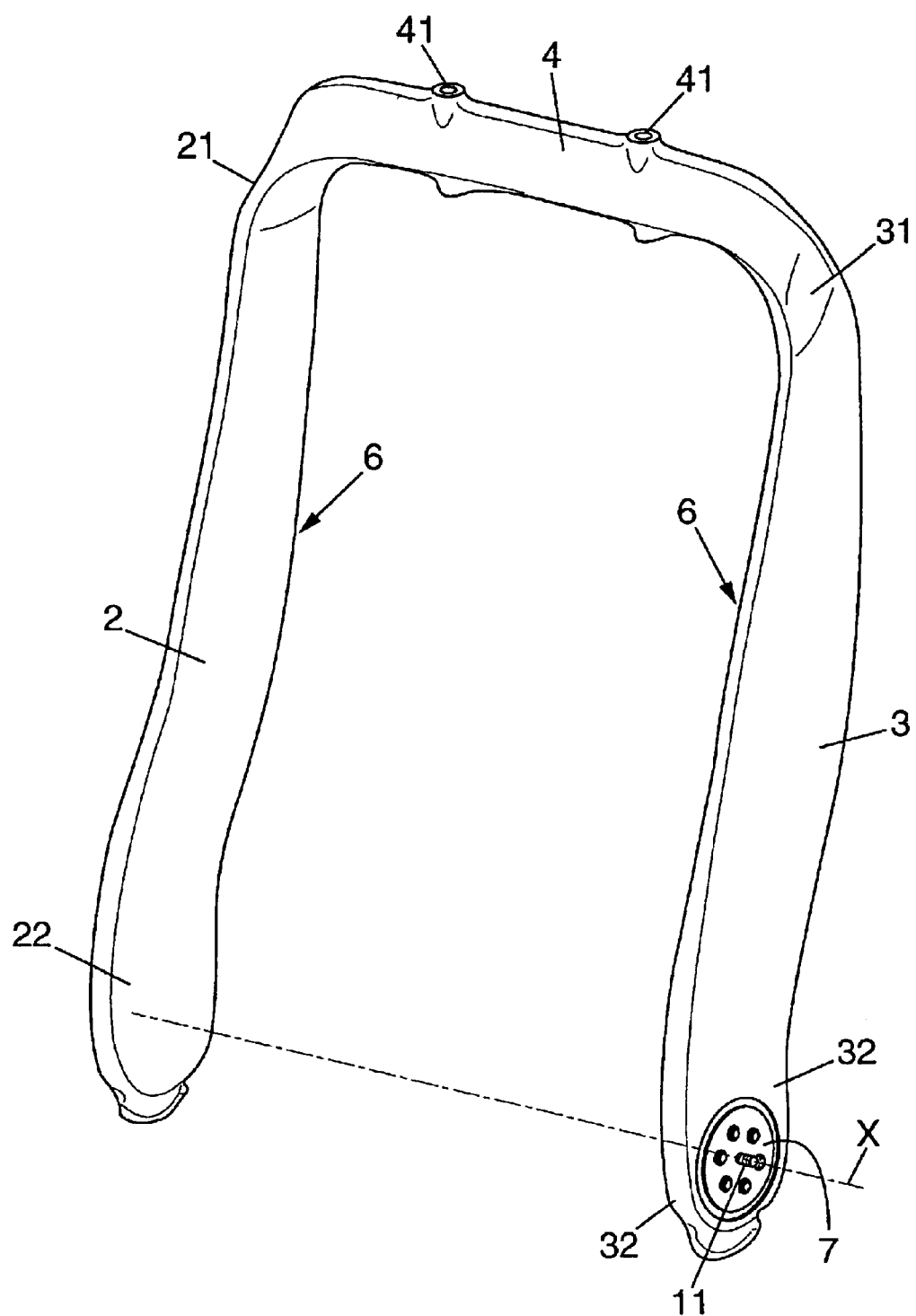
FIG. 14 is a perspective view of a seat element structure constituting a second embodiment of the invention.

In another embodiment of the invention, as shown in FIG. 14, the seat back structure 1 may comprise two side uprights 2, 3 interconnected solely by a top horizontal cross-member 4. In this case, the rigid seat back structure may be fitted with one or two hinges 7 directly overmolded by the bottom end portions 22 and 32 of the side uprights 2 and 3 while being shaped in an appropriate mold. Such an appropriate mold includes, in particular, two blocks, together with two retention elements each of which is provided with a respective pressurized air orifice, for example, in order to introduce air under pressure into both ends of the inflatable bladder, thus deforming the tubular braid 6 fixed by expansion and also deforming its two bottom ends 22 and 32 which are overmolded onto the two hinges 7.

The description above is given with reference to a rigid structure for a seat back. Naturally, it will be understood that this rigid structure constituted by a single piece made from a composite material comprising a thermoplastic matrix and reinforcing fibers could also constitute a rigid structure for a seat proper. Under such circumstances, and in accordance with the invention, the portion for fixing at least one hinge that is to be fitted to a sideplate of the structure of the seat proper is directly overmolded by the corresponding end of said sideplate of the structure of the seat proper while it is being made in the mold.

What is claimed is:

1. A rigid structure for a vehicle seat element, said structure being formed as a single piece made from a composite material comprising a thermoplastic matrix and reinforcing fibers, the structure comprising at least firstly first and second rigid sideplates each extending between a first end and a second end, and secondly a rigid horizontal cross-member secured to the second ends of the sideplates, the structure further comprising at least one hinge having a first fixing portion secured to the structure, a second fixing portion for fixing to another seat element, and a hinge mechanism interconnecting the first and second fixing portions and actuatable by a control member so that said first and second fixing portions are either free to pivot relative to each other about a pivot axis or else are locked angularly relative to each other, and wherein the first fixing portion of the hinge is overmolded by the first end of the first sideplate.

2. A structure according to claim 1, in which a portion of the first end of the first sideplate in contact with the first fixing portion of the hinge presents a housing having an end wall and a side wall extending from said end wall, said wall being pressed against the first fixing portion of the hinge, and said side end wall covering the first fixing portion of the hinge axially, at least in part.

3. A structure according to claim 1, in which the first fixing portion of the hinge comprises a plurality of elements in relief which are overmolded by the first end of the first sideplate.

4. A structure according to claim 1, in which the composite material comprises a tubular braid of reinforcing fibers including a segment forming the first end of the first sideplate which presents a section that is substantially flat and double-walled.

5. A structure according to claim 1, in which the first end of the second sideplate includes a pivot element for pivotally mounting on the other seat element, said pivot element being integrally formed with the first end of the second sideplate.

6. A structure according to claim 1, in which a second hinge is also overmolded by the first end of the second sideplate of the structure.

7. A structure according to claim 1, also comprising a second rigid horizontal cross-member having a first end integrally formed with the first end of the second sideplate and a second end overmolded on the first end of the first sideplate.

8. A structure according to claim 1, formed by a rigid structure for a seat back.

9. A rigid structure for a vehicle seat element, said structure being formed as a single piece made from a composite material comprising a thermoplastic matrix and reinforcing fibers, the structure comprising at least firstly first and second rigid sideplates each extending between a first end and a second end, and secondly a rigid horizontal cross-member secured to the second ends of the sideplates, the structure further comprising at least one hinge having a first fixing portion secured to the structure, a second fixing portion for fixing to another seat element, and a hinge mechanism interconnecting the first and second fixing portions and actuatable by a control member so that said first and second fixing portions are either free to pivot relative to each other about a pivot axis or else are locked angularly relative to each other, and wherein the first fixing portion of the hinge is overmolded by the first end of the first sideplate, and wherein a portion of the first end of the first sideplate in contact with the first fixing portion of the hinge presents a housing having an end wall and a side wall extending from said end wall, said end wall being pressed against the first fixing portion of the hinge, and said wall covering the first fixing portion of the hinge axially, at least in part, and wherein the side wall of the housing of the first end of the first sideplate presents a curved edge which extends radially towards the pivot axis of the hinge.

* * * * *

UNITED STATES PATENT AND TRADEMARK OFFICE
CERTIFICATE OF CORRECTION

PATENT NO. : 6,767,067 B2
DATED : July 27, 2004
INVENTOR(S) : François Fourrey et al.

It is certified that error appears in the above-identified patent and that said Letters Patent is hereby corrected as shown below:

<u>Column 1,</u>
Line 2, please delete "Sieges" and insert -- Siéges --.

<u>Column 8,</u>
Line 39, please delete "said wall" and insert -- said end wall --.
Line 41, please delete "said side end wall" and insert -- said side wall --.

Signed and Sealed this

Eighth Day of March, 2005

JON W. DUDAS
*Director of the United States Patent and Trademark Office*